LAUNDRY FOLDING MACHINES

Original Filed May 6, 1957 2 Sheets-Sheet 1

INVENTOR
BENJAMIN ALVIN BUSS
BY
Robertson and Smythe
ATTORNEYS

LAUNDRY FOLDING MACHINES

Original Filed May 6, 1957 2 Sheets-Sheet 2

INVENTOR
BENJAMIN ALVIN BUSS
BY
Robertson & Smythe
ATTORNEYS

United States Patent Office

Re. 24,980
Reissued May 2, 1961

24,980

LAUNDRY FOLDING MACHINES

Benjamin Alvin Buss, East Moline, Ill., assignor to American Machine and Metals, Inc., New York, N.Y., a corporation of Delaware Original No. 2,940,751, dated June 14, 1960, Ser. No. 657,259, May 6, 1957. Application for reissue Nov. 17, 1960, Ser. No. 70,090

7 Claims. (Cl. 270—69)

Figure 1A:
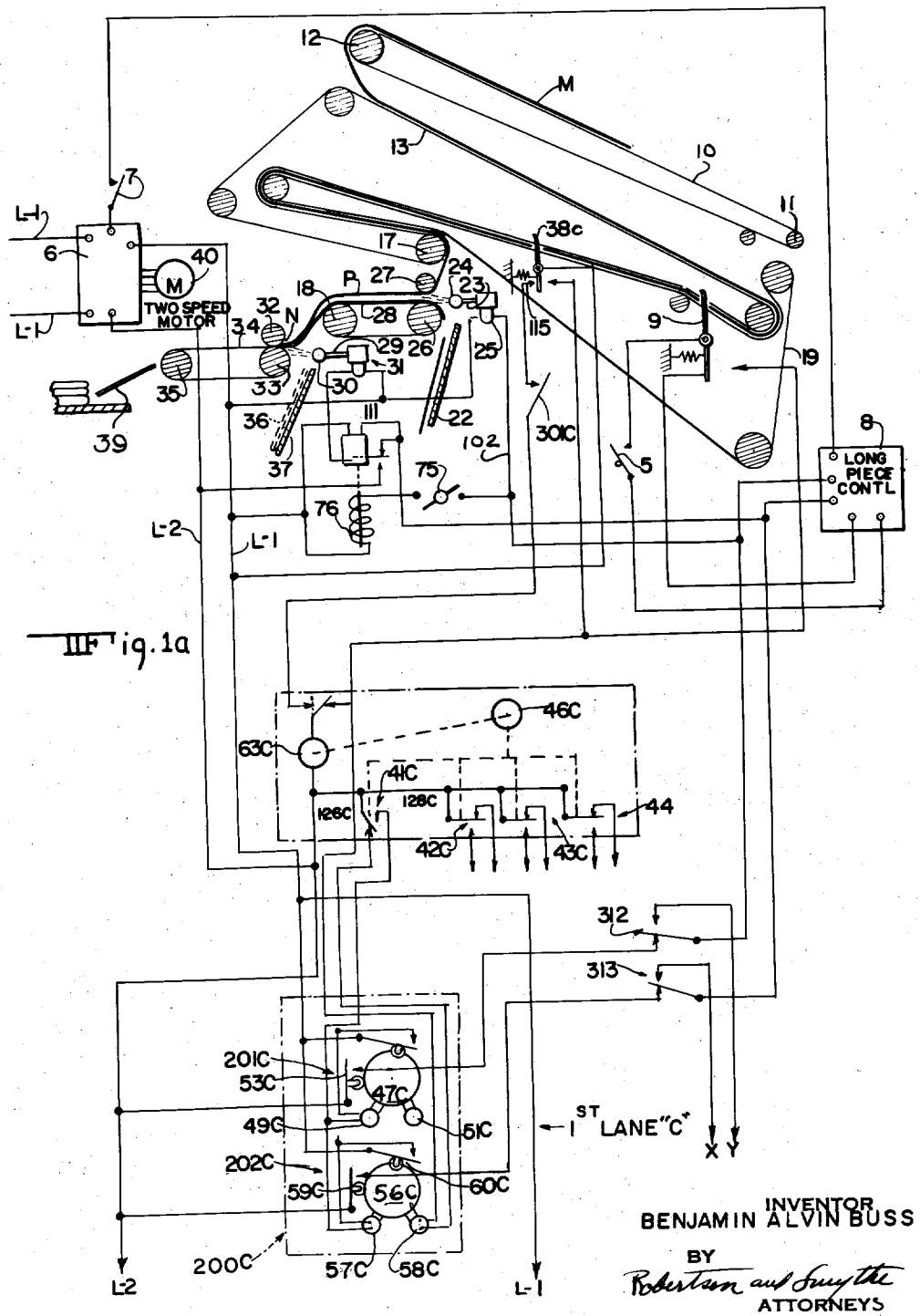

Matter enclosed in heavy brackets [ ] appears in the original patent but forms no part of this reissue specification; matter printed in italics indicates the additions made by reissue.

This invention relates to a control arrangement for folding machines such as those used to fold bed sheets, and more particularly to an arrangement wherein sheets or similar articles and also articles of shorter lengths can be folded with accuracy.

It often is required that folding operations be performed upon sheets or towels after they have been processed in other machinery such as ironers. For example, in commercial laundries the articles are washed, ironed and folded by automatically operated machines. It is desirable to have a single machine which will operate on long articles, such as bed sheets, and which will also operate on short articles, such as towels or similar short pieces. In the case of the shorter pieces, it is necessary that the folding operation or measuring arrangement function with great accuracy because an error in folding may constitute a substantial part of such a short article.

A timing and selecting control, such as may be used in conjunction with the present invention, is shown in applicant's co-pending application Serial No. 545,872 filed November 9, 1955, now U.S. Patent No. 2,858,129, or in Patent No. 2,652,246.

One of the objects of the present invention is to provide an arrangement wherein the measurement of the article will take place at a point where optimum accuracy will be obtained regardless of length of piece.

A further object of the invention is the provision of a control system which permits the use of feelers or measuring fingers for the folding point which can be located closer thereto, as compared with present devices.

The invention will be described in conjunction with a folding machine which can be arranged to receive ironed articles and convey the sheets over conventional belts past the various folding stations of the folding machine. Simple measuring and timing arrangements can be employed for selecting and setting the timing means and activating a folding mechanism such as a pneumatic folding arrangement, as seen in co-pending application Serial No. 623,143 filed November 19, 1956. Such a mechanism can be arranged to select the number of lanes used and also the number of folds. The sheets or towels to be folded are carried by the belt conveyor means past a first or long piece measuring finger means and then past a second or short piece measuring finger means, the finger means used to actuate the folding means being selected as needed. The sheet then moves downwardly to a first folding station which can be in front of a folding means, the folding means preferably being in the form of a pneumatic blast for carrying the sheet between a pair of rotating rollers. The pneumatic blast means is activated by a timing means so as to provide a blast of air directed across the sheet to move the contiguous portion thereof sidewise into contact with said rotating folding rollers. The once folded sheet then can be carried by a suitable conveyor means to a position in front of a second station having a similar folding device. The second folding blast apparatus can be arranged to be activated by the timing mechanism at a predetermined time provided the second fold is to be made in the sheet. The timing and the selecting mechanism may be the one as described in Patent No. 2,450,067 having two constant speed motors of different speeds for providing the impulses or signals for each of the folding mechanisms.

In a preferred embodiment, the conveyor belt arrangement can have a two-speed motor for driving the same, but if a long piece or bed sheet is to be folded, more room must be provided between the measuring point and the folding point. In such an instance, the first or long piece measuring finger is used and the high speed of the motor is arranged to drive the conveyor. In the case of shorter pieces, the distance between the measuring finger and the folding point is so great that problems will arise as to accuracy of the fold. As a result thereof, it has been found desirable to slow the speed of the conveyor and to place the measuring finger for this point as close to the folding station as possible. It is also evident that in place of a two-speed conveyor, a timer arrangement having a slow and high speed timer means can be provided to produce the same result.

Thus, there will be a means varying the measuring action relative to the folding means so that short pieces will be measured close to the folding means. The folding means closest to the folding point, which is adapted for small or short pieces, can be divided into any desired number of lanes, such as five. In a five lane arrangement, five fingers can be provided for this purpose, the first or wide piece measuring finger being a single one. When the device is connected so that long pieces are to be folded, the five measuring fingers for the short pieces will be de-activated and the single finger along with the higher relative speed arrangement activated.

By the use of the arrangement of the present invention, the folding error will be reduced because measuring will take place close to the point of fold for the short pieces.

These and other objects, advantages and features of the invention will become apparent from the following description and drawings.

Figure 1B:
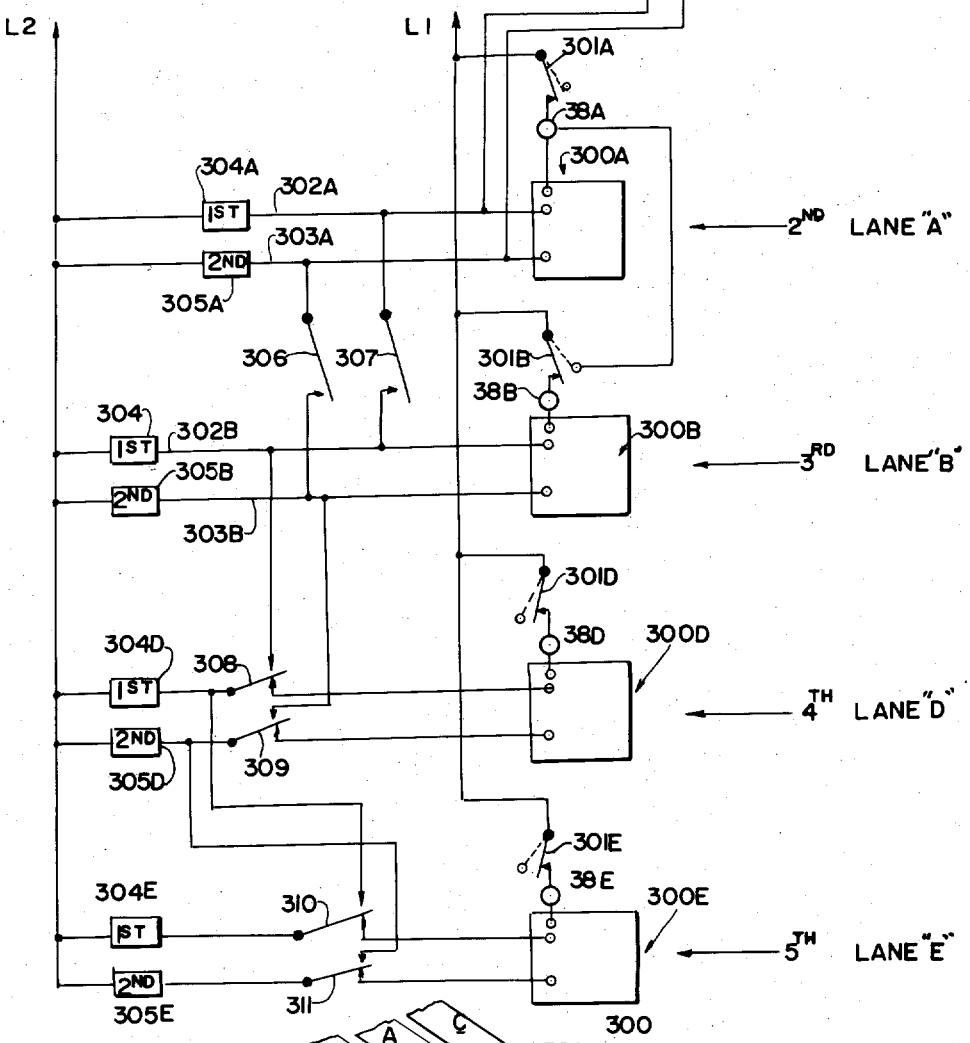
Figure 2:
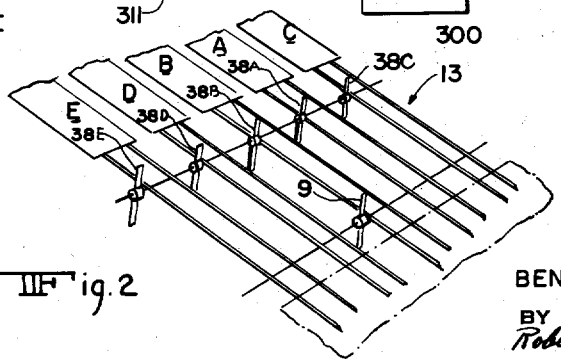

In the drawings:

Figs. 1a and 1b show a schematic wiring diagram of a folding and timing apparatus made in accordance with the present invention; and Fig. 2 is a schematic fragmentary view of the folding apparatus measuring fingers.

Reference may be made to the aforementioned co-pending applications for details of the measuring and folding devices, it being understood that other arrangements can be used.

In general, folder conveyor motor 40 may be of any suitable two speed type connected to the line through two position switch 6 so as to operate the motor at high or low speed. Switch 6 can be interconnected with switches 5 and 7 or separately operated so that when closed, long pieces will activate the long piece controller shown schematically at 8, which is controlled by the first or long piece measuring finger 9. As will be explained hereafter, the other switches can be set so that all of the folding means across the folder will be operated by the single long piece measuring finger 9. If switch 6 be operated so as to activate the short piece measuring fingers, one of which is shown at 38C, the folder motor 40 will be operated at slow speed. The switches operating the various lane controllers then can be connected as needed and the one or double fold control set as desired.

In Fig. 1a, sheet M is illustrated on an endless conveyor ribbon belt means 10, said belt means passing over spaced rollers 11, 12, sheet M being fed onto belt 13. Conveyor belt means 19, cooperating with belt means 13, can be arranged to receive sheet M so that it will be gripped between said belts 13 and 19 and carried along on its path. As the sheet passes over roll 17, it can be directed downwardly, its lower edge being guided by shield 22, the sheet P passing in front of the first folding station. In the form shown herein, five lanes, lettered A to E inclusive, are contemplated such as seen in Fig. 2, A and B being considered to be the "master" lanes. A separate folding apparatus with its related valve 25 is provided for each lane. Mechanical folders also could be used, although pneumatic ones are preferred.

Pneumatic blast arrangements including a manifold or pipe 24 extending across each of the lanes can be provided, air thereto being controlled by a suitable valve 25 for each pipe, the valve being opened by a signal from the timing mechanism for the particular lane or for the single long piece finger 9. The operating elements for each lane will be given appropriate letters in addition to the numerals so as to indicate the lane concerned.

When the sheet reaches a correct position in front of the air blast for a lane as determined by the measuring and timing apparatus being employed, the particular air blast solenoid is energized so as to blow and move a center portion of the sheet between the first folding rolls 26 and 27, belt 28 being guided by the first folding roller 26 and 18.

The folded edge N of sheet P then will be moved on belt 28 so as to pass downwardly over roll 18 and in front of the second folding apparatus 29 for each lane. Each of the second folding apparatus preferably may comprise an air blast manifold or pipe 30 for each lane and solenoid 31 operable to control the flow of air from pipe 30 in a manner similar to the first folding station. The second folding rolls 32, 33 are arranged similar to the first station, belt means 34 being guided by roll 33 and roll 35.

If a second fold is to be made in the sheet, the once folded edge N of sheet P will move downwardly as indicated in dotted lines 36 and be guided by the second fold station guide 37. At an appropriate time and in proportion to the length of the sheet, the second air blast folder 29 will be activated so as to cause the desired portion of the sheet or article to move sidewise into gripping relationship between folding rolls 32 and 33.

Each of the air blast solenoids 25 and 31 will be actuated at appropriate times in accordance with the timing mechanism as governed by the appropriate sheet measuring switch or sensing finger for the lane or for the piece. In the event that only a single fold is to be made, air blast 29 is activated by the timing mechanism so that the leading edge N of sheet P will receive a blast of air before or as it reaches folding rolls 32, 33 so that the leading folded edge N will be drawn directly between the side rolls and carried to collecting station 39.

Normally, a plurality of timing and selecting means will be used for each lane, such as shown in said application Serial No. 545,872, but it is to be understood that other types of selecting and timing mechanisms can be employed, for example, such as shown in Patent No. 2,652,246.

First, the timing mechanism operable by a short piece measuring finger will be described. In order to control successive operations of folding mechanisms 23 and 29 and to provide the successive timed blasts of air for a lane when a plurality of sheets, one following the other, pass through the machine, a plurality of timing mechanisms similar to the one illustrated at 200C can be provided as needed, such being described in detail in said co-pending application Serial No. 545,872, each of the timing mechanisms consisting of a plurality of sub-timing devices for operating the folding means for the lane. One set of timing means is provided for each of the folding means used.

By way of example, timing device 200C may have sub-timing mechanisms 201C, 202C, sub-timing mechanism 201C operating the first pneumatic blast folding mechanism for lane C and sub-timing means 202C operating the second pneumatic blast timing mechanism at the desired time.

Each of the sub-timing devices 201C and 202C in the timing mechanism 200C is controlled by the short piece measuring switch means 38C and motor switch means 41C, other selector switches 42C, 43C, 44C being provided as indicated in block 45C, said selector switches being operated for activating other timing mechanisms for the lane, for example, by a cam means schematically shown at 46C.

Sub-timing device 201C controlling air blast means 23 for the lane may be composed of a cam 47 driven by high speed motor 49C of the constant speed type through an overrunning clutch means, while low speed motor 51C also is adapted to drive cam 47C through an overrunning clutch means. Thus, cam 47 can be drive by either of motors 49C or 51C, the slow speed motor driving the cam as a sheet is passing the measuring finger involved.

Switch 53C is placed at a predetermined location relative to its cam and serves to operate the first station air blast means 23 when the indentation on the cam is engaged by follower 54C of switch 53C. The other sub-timing device 202C controls operation of the second air blast folding means 29 for the lane, and can be composed of cam 56C and motors 57C and 58C corresponding to similar elements in device 201C, motors 57C and 58C having overrunning clutches to permit rotation of cam 56 by either of said motors. Switch 59C with its follower serves to control air blast folding means 29. The speeds of the drive motor 40 and high speed motor 49C are so related to the motor speed of drive motor 40 and distance of the folding point from the measuring point that a sheet between conveyor belts 13 and 19 would have its trailing edge folding point positioned adjacent the point at which folding means 31 is operated when cam 47 has completed a predetermined portion of a revolution. The speed of low speed motor 51C is related to the speed of high speed motor 49C in such a manner as to permit cam 47C to actuate switch 53C at a time when the proportionately spaced fold point of the sheet on the conveyor belt passes folding means 23 for the lane. The speeds of motors of sub-timing device 202 are similarly related to each other and to the selected speed of drive motor 40, so that comparable operation is effected for folding means 29 for the lane.

Assuming initially that only timing mechanism 200C is operated, it can be seen that both low speed motors 51C and 58C will be energized when the leading edge of the sheet engages short piece measuring switch 38C for the lane, there being a short piece measuring finger for each lane, or a single long piece measuring switch as will be described hereafter. As soon as cams 47C and 56C start to rotate, the notches therein are moved out of engagement with the followers of switches 55C and 60C, thus closing both of said switches. High speed motors 49C and 57C are not energized at this time, however, since the movable member of cam actuated switch 41C is connected to contact 126C rather than contact 128C. Cams 47C and 56C continue to rotate at their low speeds until the trailing edge of the sheet passes the article engaging portion of measuring switch 38C, at which time movable member moves into engagement with contact 115. At this point, cam actuated switch 41C is operated by the sequence controller 45, as described in application Serial No. 545,872, to connect the movable member of 41C with contact 128C and thus energize the high speed motors 49C and 57C. When the high speed motors 49C and 57C are energized, cams 47C and 56C are rotated at high speeds until the followers of switches 53C and 59C are engaged by the notches in the cams to operate folding means 23 and 29 at their correct times.

The sequence switch motor 63C is suitably connected across the supply lines and operates to choose the next timer (not shown) for measuring for the next sheet in the lane.

In the event it is desired to produce only a single fold, switch 75 can be closed so as to complete a circuit between line 102 and line L–1 through solenoid 76 of the mechanical latch type relay 111. Such will cause only the first folding arrangement to be effective in folding a sheet, the second blast also being actuated to feed the folded edge of the sheet directly into the folding rollers.

Each of the controllers shown schematically in boxes 300A, 300B, 300D, 300E (Fig. 1b) may contain a sequence switch arrangement similar to that described for box 45C and for timing mechanism 200C. Each has a short piece measuring switch or finger 38A, 38B, 38D and 38E, respectively, associated therewith and operable in a manner similar to that described for 38C. Each of the measuring switches is connected to line L–1 through a switch as follows: 301C for lane C, 301A for lane A, 301B for lane B, 301D for lane D, and 301E for lane E. First and second folding solenoids for operating the various folding mechanisms of the respective lanes are connected in lines 302, 303, for each (a suitable suffix indicating the lane). For lane A, the first folding solenoid is indicated at 304A and the second at 305A.

With the switches arranged as shown in Figs. 1a and 1b, each of the lanes is separably operable by its measuring switch and folding means. If it is desired to connect lanes A and B together with the measuring finger for lane A performing the measuring, then switch 301B will be opened and switches 306 and 307 closed. As a result thereof, when measuring switch 38A is activated by an article passing over the short piece measuring switch, activating energy will be fed to line 302A from the timing and measuring apparatus 300A, the impulse or energy also being fed through closed switch 307 to line 302B and the first folding solenoid 304B of lane B. Similarly, the second impulse or energy for the second folding operation will be fed to line 303A and line 303B from 300A through closed switch 306. Opening of switch 301B will disable timing mechanism 300B and permit 300A to operate both lanes A and B simultaneously. In a similar manner, the folding devices of lane D can be connected to be operated by lane B by moving switches 308 and 309 upwardly, switch 301D being opened. It should be apparent that lane D can be operated then by either short piece measuring finger 38A or 38B. If it is desired to connect lane E with the next adjacent lane, or in turn to lanes A and/or B, then switches 310 and 311 are moved to their upper position so that an impulse will be received from their next operative lane. Similarly, lane C can be connected to its adjacent master lane A by shifting switches 312 and 313 from their lower position to their upper position. Thus, any combination of adjacent lanes selectively can be connected together and either of the master lanes used to operate all of the folding controls.

When it is desired to operate on a long piece, switches 5, 6 and 7 can be actuated to connect the conveyor drive motor so that it will be operated at a higher speed than when the short piece fingers are used, the conveyor or motor speed being related to the speed of the timing mechanisms in the long piece control apparatus 8 and the distance of the long piece measuring finger 9 from the folding point so that the folds will be made in the correct or predetermined places or points. The other switches are appropriately positioned so that the controller impulses from controller 8 will actuate all of the folder mechanism across the folder at each fold impulse.

It is to be understood that a single speed controller motor could be employed and the speed of the timing mechanisms related to provide the desired results. In such an instance, switch 6 and the two speed motor would be omitted and in place thereof, the high and low speed motors of the sub-timing mechanism of the long piece controller would be chosen so as to have the proper speeds relative to the conveyor speed so that the folding mechanism will operate at the proper time, the sub-timing motors running faster than the sub-timing motors 49C and 51C, respectively, of the short piece controller. Also other details of construction can be varied without departing from the spirit of the invention, except as defined in the appended claims.

What is claimed is:

1. In an article folding machine for folding short or long articles, the combination including conveying means for transporting articles in said machine, folding means, at least two article length measuring stations spaced from each other in the direction of movement of articles through said machine and before their passage through said folding means, one being closer to said folding means than the other, timing and measuring apparatus for each of said measuring stations related to the speed of the conveying means and responsive to the passage of said articles, the relationship of the speed of said timing and measuring apparatus at each of said measuring stations to the speed of the conveying means being different, said timing and measuring apparatus controlling said folding means so as to make folds in predetermined places in articles passing through, and switch means selecting either of said measuring apparatus for operating said folding means, short articles being measured by the station nearest to the folding means and long articles by the station farthest from said folding means.

2. In an article folding machine for folding short and long textile articles and the like, the combination including conveying means for transporting articles therethrough, conveyor driving means, folding means along the path of said articles, measuring means and timing means for short articles, measuring means and timing means for long articles, said measuring means being spaced along the path of articles before their passage through said folding means, the short article measuring means being located in said path closer to the folding means than the measuring means for long articles, said measuring means and timing means responsive to the passage of said articles and controlling said folding means, said timing means and conveyor driving means having their speeds related so that said folding means will be actuated thereby at predetermined points, and switch means selectively operable in accordance with the length of articles to be processed so that one of said measuring and timing means at a time will be effective to actuate said folding means.

3. In an article folding machine for folding short and long textile articles and the like, the combination including conveying means for transporting articles therethrough, two speed conveyor driving means, folding means along the path of said articles, measuring means and timing means for short articles, measuring means and timing means for long articles, said measuring means being spaced along the path of articles before their passage through said folding means, the short article measuring means being located in said path closer to the folding means than the measuring means for long articles, said measuring means and timing means responsive to the passage of said articles and controlling said folding means, said timing means and conveyor driving means having their speeds related so that said folding means will be actuated thereby at predetermined points, and switch means selectively operable in accordance with the length of articles to be processed selecting one of said measuring and timing means and motor speed so that one of said measuring and timing means at a time will be effective to actuate said folding means.

4. In an article folding machine for folding short and long textile articles and the like, the combination including conveying means for transporting articles therethrough, conveyor driving means, folding means along the path of said articles, said conveying means having a plurality of lanes, measuring means and timing means for each lane for short articles, measuring means and timing means for long articles, said measuring means being spaced along the path of articles before their passage through said folding means, the short article measuring means being located in said path closer to the folding means than the measuring means for long articles, said measuring means and timing means responsive to the passage of said articles and controlling said folding means, said timing means and conveyor driving means having their speeds related so that said folding means will be actuated thereby at predetermined points, and switch means selectively operable in accordance with the length of articles to be processed so that one of said measuring and timing means at a time will be effective to actuate said folding means.

5. In an article folding machine for folding short and long textile articles and the like, the combination including conveying means for transporting articles therethrough, two speed conveyor driving means, folding means along the path of said articles, said conveying means having a plurality of lanes, measuring means and timing means for each lane for short articles, measuring means and timing means for long articles, said measuring means being spaced along the path of articles before their passage through said folding means, the short article measuring means being located in said path closer to the folding means than the measuring means for long articles, said measuring means and timing means responsive to the passage of said article and controlling said folding means, said timing means and conveyor driving means having their speeds related so that said folding means will be actuated thereby at predetermined points, and switch means selectively operable in accordance with the length of articles to be processed selecting one of said measuring and timing means and motor speed so that one of said measuring and timing means at a time will be effective to actuate said folding means.

6. In an article folding means for folding short and long textile sheets and the like, the combination including conveying means for transporting sheets therethrough, said conveying means having at least three lanes, short piece electrically operated sheet measuring means for each lane, folding means for each lane, long piece electrically operated sheet measuring means spaced along the path of sheets therethrough a distance from said folding means greater than said short piece measuring means, said measuring means being responsive to the passage of said sheets, means operated by the response of said short piece measuring means for actuating said folding means for the respective lane, means operated by the response of said long piece measuring means for actuating said folding means for all of said lanes, the relationship of the speed of the short piece measuring means and the actuating means operated thereby and the relationship of the speed of the long piece measuring means and the actuating means operated thereby to the speed of the conveying means being different, and means selectively connecting said measuring means to said folding means so that long articles will be measured by said long piece measuring means and short articles by said short piece measuring means.

7. In an article folding means for folding short and long textile sheets and the like, the combination including conveying means for transporting sheets therethrough, said conveying means having at least three lanes, a two speed conveying means motor, motor control means for controlling the speed of said drive means, short piece electrically operated sheet measuring means for each lane, folding means for each lane, long piece electrically operated sheet measuring means spaced along the path of sheets therethrough a distance from said folding means greater than said short piece measuring means, said measuring means being responsive to the passage of said sheets, means operated by the response of said short piece measuring means for actuating said folding means for the respective lane, means operated by the response of said long piece measuring means for actuating said folding means for all of said lanes, and means selectively connecting said measuring means to said folding means and said motor control means so that long articles will be measured by said long piece measuring means and said motor driven at high speed and short articles by said short piece measuring means and said motor driven at low speed.

References Cited in the file of this patent or the original patent

UNITED STATES PATENTS

| | | |
|---|---|---|
| 2,374,779 | Preston | May 1, 1945 |
| 2,659,598 | McLagan | Nov. 17, 1953 |
| 2,743,920 | Petre | May 1, 1956 |
| 2,743,921 | Spreckelmeier | May 1, 1956 |